(12) United States Patent
Dale

(10) Patent No.: US 8,603,801 B1
(45) Date of Patent: *Dec. 10, 2013

(54) METHOD OF PROCESSING STILLAGE

(75) Inventor: Ross Dean Dale, Oskaloosa, IA (US)

(73) Assignee: Golden Corn Technologies, LLC, Oskaloosa, IA (US)

( * ) Notice: Subject to any disclaimer, the term of this patent is extended or adjusted under 35 U.S.C. 154(b) by 43 days.

This patent is subject to a terminal disclaimer.

(21) Appl. No.: 13/463,581

(22) Filed: May 3, 2012

Related U.S. Application Data

(63) Continuation of application No. 12/399,716, filed on Mar. 6, 2009, now Pat. No. 8,173,412.

(51) Int. Cl.
*C11C 1/00* (2006.01)

(52) U.S. Cl.
USPC .......................................................... 435/271

(58) Field of Classification Search
None
See application file for complete search history.

(56) References Cited

U.S. PATENT DOCUMENTS

| | | | |
|---|---|---|---|
| 5,503,750 A | 4/1996 | Russo | |
| 5,863,574 A | 1/1999 | Julien | |
| 6,660,506 B2 | 12/2003 | Nguyen et al. | |
| 6,962,722 B2 | 11/2005 | Dawley et al. | |
| 7,255,873 B2 | 8/2007 | Nakata | |
| 7,261,888 B1 | 8/2007 | Decuypere et al. | |
| 7,263,934 B2 | 9/2007 | Copeland et al. | |
| 7,309,602 B2 | 12/2007 | David | |
| 7,527,941 B1 | 5/2009 | Hogen et al. | |
| 7,601,858 B2 | 10/2009 | Cantrell | |
| 8,008,516 B2 | 8/2011 | Cantrell | |
| 8,008,517 B2 | 8/2011 | Cantrell | |
| 8,143,444 B2 | 3/2012 | Mariansky | |
| 8,153,006 B1 | 4/2012 | Fessler | |
| 8,283,484 B2 | 10/2012 | Cantrell | |
| 2003/0232109 A1 | 12/2003 | Dawley | |
| 2004/0023349 A1 | 2/2004 | Bisgaard-Frantzen et al. | |
| 2006/0041153 A1 | 2/2006 | Cantrell et al. | |
| 2006/0251764 A1 | 11/2006 | Abbas et al. | |
| 2007/0036881 A1 | 2/2007 | Griffith | |
| 2007/0128334 A1 | 6/2007 | Pittman | |
| 2007/0210007 A1 | 9/2007 | Scheimann et al. | |
| 2007/0231311 A1 | 10/2007 | Kroening | |
| 2007/0238891 A1 | 10/2007 | Winsness et al. | |
| 2007/0249029 A1 | 10/2007 | Marshall et al. | |
| 2008/0003654 A1 | 1/2008 | Hirl | |
| 2009/0006280 A1 | 1/2009 | David | |
| 2011/0223284 A1 | 9/2011 | David | |
| 2011/0269185 A1 | 11/2011 | David | |
| 2012/0208252 A1 | 8/2012 | Brotherson | |
| 2012/0244591 A1 | 9/2012 | Brotherson | |
| 2013/0149750 A1 | 6/2013 | Brotherson | |
| 2013/0149763 A1 | 6/2013 | Brotherson | |
| 2013/0149764 A1 | 6/2013 | Brotherson | |

FOREIGN PATENT DOCUMENTS

| | | |
|---|---|---|
| WO | WO 92/15771 A1 | 9/1992 |
| WO | WO 02/38786 A1 | 5/2002 |
| WO | WO 2005/079190 A2 | 9/2005 |
| WO | WO 2005/079193 A2 | 9/2005 |
| WO | WO 2006/023432 A2 | 3/2006 |
| WO | WO 2007/056321 A1 | 5/2007 |
| WO | WO 2007/098396 A2 | 8/2007 |
| WO | PCT/US2007/066024 | 10/2007 |

OTHER PUBLICATIONS

Direvo Industrial Biotechnology, GMBH, "Direvo reaches milestone in consolidated bioprocessing of lignocellulose to lactic acid," Press Release dated Mar. 11, 2013.
"BluCon-L," printed May 13, 2013, from Internet website found at http://www.direvo.com/processes/blucon-I.html.
"Technology Platform," printed May 13, 2013, from Internet website found at http://www.direvo.com/processes/platform.html.

*Primary Examiner* — Suzanne M Noakes
(74) *Attorney, Agent, or Firm* — Boardman & Clark LLP

(57) ABSTRACT

A method for processing of byproducts in an ethanol production process is provided. The method includes applying a mixture of a microorganism to a stillage stream, metabolizing gums in the stillage stream using the mixture to release oil in the gums carried by the stillage stream and recovering the oil. Methods of liberating or releasing bound oil present in stillage are also provided.

17 Claims, 4 Drawing Sheets

Table 1. Components of distillers thin stillage at various incubation times. g/100g as is.

| | Incubation time, hours | | | | |
|---|---|---|---|---|---|
| Item | 0 hrs. | 12 hrs. | 24 hrs. | 36 hrs. | 48 hrs. |
| Clear oil | 0.4 | no recovery | 2.2 | 2.8 | 2.8 |
| Gums | 4.4 | no recovery | 2.7 | 1.3 | 1.8 |
| Insolubles | 1.3 | 1.1 | 0.5 | 0.4 | 0.5 |

Table 2. Components of distillers thin stillage after various incubation times. g/100g.

| | Incubation time, hours | | | | |
|---|---|---|---|---|---|
| Item | 0 | 12 | 24 | 36 | 48 |
| Clear Oil | No recovery | 0.20 | 0.43 | 0.60 | 0.62 |
| Gums | 0.76 | 0.76 | 0.70 | 0.60 | 0.48 |
| pH | 7.00 | 6.98 | 6.78 | 6.27 | 5.84 |

FIG. 4

METHOD OF PROCESSING STILLAGE

CROSS-REFERENCE TO RELATED APPLICATIONS

This application claims the benefit of and priority to related U.S. Provisional Patent Application Ser. No. 61/034,810, filed Mar. 7, 2008, entitled "METHOD OF LIBERATING BOUND OIL PRESENT IN STILLAGE", the contents of which is hereby incorporated by reference in its entirety.

FIELD OF INVENTION

The invention is generally directed to methods of removing oil from corn-based and other agricultural products, and more specifically to a method of liberating bound oil present in whole stillage and thin stillage.

BACKGROUND

The production of ethyl alcohol in dry-mill ethanol plants utilizing whole grains as feedstock is a major component of fuel alcohol in the U.S. A plant utilizing corn as feedstock can typically produce 2.7-2.8 gallons of ethanol and 17-18 lbs. of distillers grains with solubles (dry basis) per bushel of corn. While ethanol is the core product and the reason the processing plant exists, the byproduct, distillers grains with solubles, is also an important and significant revenue stream for an ethanol plant. Beyond increasing or improving the efficiency of ethanol production and yield from corn, optimizing the value and dollar return of the byproduct stream is critically important to maximize profitability.

One proposed method of increasing the value of the byproduct is to remove the crude oil contained within it for use in other industrial processes such as biodiesel production. Each bushel of corn that may produce 2.7 gallons of ethanol, also contains approximately 2 lbs of corn oil. Further, a typical 100 million gallon per year corn-to-ethanol production plant will discard approximately 40,000 short tons of crude corn oil per year in the distillers grains byproduct.

The total corn-to-ethanol industry in the United States is expected to grow to about 15 billion gallons per year by 2015 with an estimated 6 million short tons of corn oil in the byproduct. The byproduct, distillers grains with solubles, is a good livestock feed, especially for ruminants, and the oil content has feed value. However, as the amount of distillers grains increases and the supply of corn available for feeding decreases, it becomes economical to replace increasing amounts of corn in a ration with distillers grains.

When distillers grains are used as feed, at higher levels of inclusion of the byproduct the oil content in the byproduct begins to have deleterious effects on the animal, such as reduced milk fat production in dairy cows, reduced conception rates, soft fat in pork and bacon due to a high level of unsaturation, as well as reduced feed intake and weight gain in beef feedlot cattle. Therefore, there are significant advantages to removing the oil from the byproduct, such as increasing the level of effective inclusion in livestock diets and allowing the oil to be directed toward higher value industrial processes or feed markets.

Solutions have been attempted to remove oil from grains. For example, soybeans, canola, sunflowers, cottonseed, peanuts, and other commodities are valued for their oils. Technologies, such as solvent extraction or extrusion, exist for the efficient and economical removal of oil from these commodities. However, these same technologies are generally applied to corn at the front end of an ethanol production process, that is, prior to distillation. Unfortunately, the oil content in corn grain is typically only between 3.5% and 4.0% and removing it from the grain is not very cost effective. An alternative solution is to fractionate the germ from the rest of the corn kernel for oil removal, as the germ contains approximately 25% oil. It is by this fractionation method that commercial corn oil is typically obtained in the wet milling industry. Unfortunately, in dry milling, corn components such as germ, pericarp and endosperm do not separate easily or cleanly, as compared to wet milling processes. For example, the germ can be separated by a dry milling process, however it is at the expense of some starch loss which results in lower ethanol plant productivity and profit.

In addition to the current issues in removing oil, in the ethanol production process, thin stillage typically can only be condensed to a total solids content ranging between 20% and 30%. Further, the gums and waxes in the thin stillage cause the solubles to become very viscous when it is condensed and these components often cause fouling of condensers. Further, while it is possible to use a high speed centrifuge to remove crude corn oil from thin stillage, the industry has only been able to achieve between 25%-80% removal of total oil in thin stillage due to the presence of these gums and waxes which are bound with the oil and are loathe to relinquish their bonds. At best, solutions to remove or separate crude oil in thin stillage necessitate the use of very high speed, costly centrifuges to recover a portion of the oil as the gums within stillage bind the oil. Moreover, the 25%-80% recovery of total oil in thin stillage is equal to only approximately 48% of the total oil available in whole stillage (60% of the oil from whole stillage present in thin stillage multiplied by 80% recovery).

Separation of oil from the grains, which constitutes a majority of the oil, cannot typically be accomplished by centrifugation because the oil is still bound within the germ. Therefore, solutions often include extraction methods. Typical extraction methods for oilseeds include solvent extraction with organic solvents such as hexane, benzene, ethanol, methanol and others, as well as extruding techniques which apply very high pressure and temperature to the material to 'squeeze' the oil out. Unfortunately, these methods are high cost compared with the relatively low amount of oil contained within the distillers grains (about 7.5% on a dry basis) and often include toxic chemicals. In addition, solvent extraction is not oil-specific but also extracts other components soluble in organic solvents, such as the gums which are also present in thin stillage, resulting in a crude oil with a high level of impurities requiring further refining.

Accordingly, there is a need in the art to more efficiently reduce or extract the oil content of distillers grains byproduct in a dry mill ethanol plant. There is also a need to increase the efficiency and yield of crude oil removal from distillers whole stillage or thin stillage while increasing the overall profitability of ethanol production plants by improving the value of the byproducts.

SUMMARY OF THE INVENTION

A method for processing of byproducts in an ethanol production process is provided. The method includes applying a mixture of a microorganism to a stillage stream, metabolizing gums in the stillage stream using the mixture to release oil in the gums carried by the stillage stream and recovering the oil.

A method of liberating bound oil present in stillage is also provided. The method comprises applying a microorganism to whole stillage to metabolize the stillage and separate oil bound to gums caused by the stillage, the microorganism further acting in conjunction with an enzyme adapted to metabolize at least one of a protein and a polysaccharide in the stillage.

A further method of releasing bound oil in stillage is provided. The method includes propagating a microorganism in stillage which utilizes gums present in stillage as a source of metabolizable carbohydrate. The method also includes providing an enzyme in the stillage which acts extracellularly to hydrolyze at least one of a protein and a polysaccharide in the stillage. These steps result in releasing oil from the gums to form free oil in an emulsion with the stillage.

The methods described herein facilitate the recovery of crude oil from said stillage and more efficiently reduce or extract the oil content of distillers grains byproduct, as well as crude oil from distillers whole stillage or thin stillage, in a dry mill ethanol plant as compared to current systems. The increase in efficiency and yield results in increased overall profitability of ethanol production plants, by reducing energy consumption and improving the value of byproducts. In the method described and illustrated herein, the action of the microbes and/or enzymes upon the stillage results in an amount of free oil as well as the reduction of or substantial elimination of gums, facilitating the yield and economical recovery of oil from stillage. The microorganisms advantageously utilize gums as at least one source of metabolizable carbohydrate, thereby reducing the level of gums in stillage while freeing oil, increasing cell biomass and producing potentially valuable organic acids such as, but not limited to, lactic, acetic, propionic, butyric, succinic, citric, and other acids or their equivalents, as metabolic byproducts, in stillage. The method described provides further advantages, by removing the oil from the byproduct distillers grains, such as increasing the level of effective inclusion in livestock diets which permits the byproduct to be incorporated into livestock rations at higher levels, as well as allowing the oil to be directed toward higher value industrial processes or feed markets. Further, and contrary to currently existing systems, the method described herein may increase oil recovery from thin stillage to percentages above that of currently existing systems, and may in some embodiments reach nearly 100% oil recovery from thin stillage, while using low speed centrifugation.

BRIEF DESCRIPTION OF THE DRAWINGS

FIG. 4 shows tables of components of thin stillage at various incubation times according to one or more examples of embodiments of the method of liberating bound oil.

DETAILED DESCRIPTION

As described herein, oil is extracted or liberated from a byproduct during a fermentation process, such as may occur during an ethanol production process. The method generally includes extraction of oil at or near the "end" of the ethanol production process, and more preferably after the distillation step. Oil is extracted from the whole stillage or thin stillage. While the process described herein is particularly adapted to corn processing and production of ethanol and corresponding byproducts, it is contemplated that the process or components thereof may be applied more generally to a fermentation process and/or may be fitted or arranged for application to products such as soybeans, canola, sunflowers, cottonseed, peanuts, or other commodities where said commodities are compatible for use with the methods and material described herein, and their processing, without departing from the overall scope of the present invention.

Figure 1:
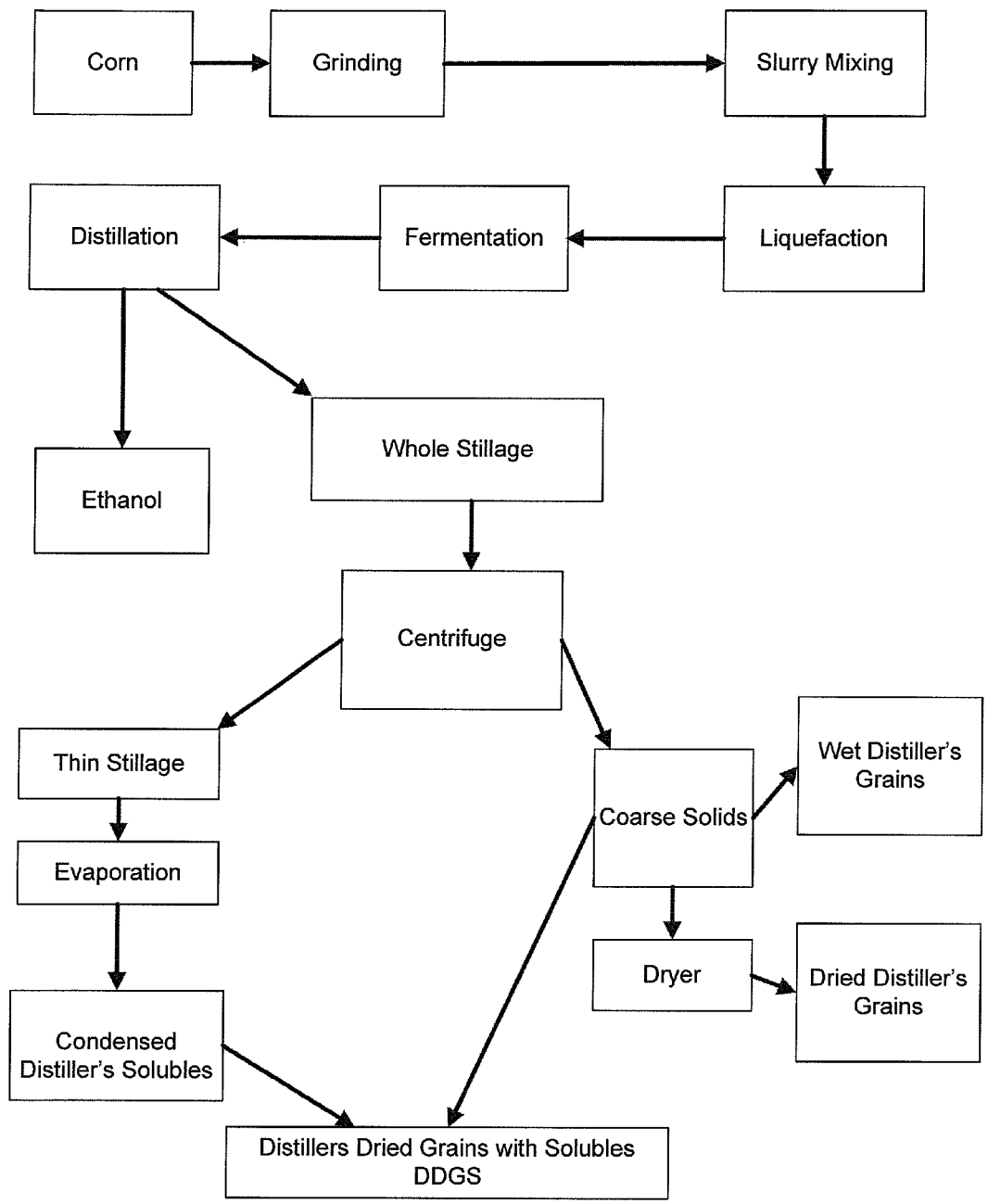
FIG. 1 shows a schematic diagram of a process flow in a dry mill ethanol plant suitable for use with the method of liberating bound oil described herein.

FIG. 1 illustrates one or more examples of a process flow in a dry mill ethanol plant. In the production of ethanol, generally, corn is ground and formed into a slurry. The slurry is mixed and formed into a liquid or liquefaction. The liquid is then fermented to form the mash or beer, and subsequently distilled. That is, ethyl alcohol is distilled off of the corn based product stream, which is generally in the form of a mash or beer, separating the product stream into ethanol and whole stillage. After the ethyl alcohol is distilled off of the mash or beer, whole stillage is the remaining fermentation media containing remaining nutrients, including corn oil. The grains or large insoluble fractions may be removed from the whole stillage by centrifugation or filter presses.

Two byproduct streams result from the foregoing process; a first stream including large particle, insoluble distillers grains and a second stream of a thin syrup or stillage containing the solubles and small insoluble components that are not easily separated into the grains fraction. The thin stillage generally includes dissolved solubles in water along with the small insoluble components.

As one example, approximately 40% of the original corn oil is fractioned into the distillers grains while the remainder, approximately 60% of the total, is fractioned into the thin stillage. As a further non-limiting example, one ton of whole stillage may contain 15% total solids and 32 lbs. of corn oil. Approximately 900 lbs of the whole stillage is fractioned into thin stillage and 1100 lbs. into wet grains (after centrifugation). Of the 32 lbs. of oil in the whole stillage, approximately 18 lbs. goes into the thin stillage and 14 lbs. goes into the grains.

The oil content of thin stillage may range between 1.5%-2.4% on a wet basis and total solids may range between 10%-15%. The oil content of grains may range between 1.7%-2.3% on a wet basis and total solids may range between 25%-40%.

The oil may include one or more of triglycerides, diglycerides, monoglycerides and free fatty acids. The bound oil in the whole or thin stillage may be bound in compounds within stillage such as, but not limited to, glycolipids, phospholipids, glycosphingolipids, plant waxes, glycerophospholipids and lipidproteins. This group of compounds is referred to generally herein as "gums". The oil is emulsified in the stillage or bound with the gum. The bound oil is generally in the non-aqueous phase.

Microorganisms, enzymes or any combination thereof may be added to the stillage, namely the whole or thin stillage, to metabolize the oil containing compounds within whole or thin stillage, causing the oil to become unbound and forming emulsions with oil, thereby making it easier to recover the oil by conventional means. To this end, a concentration of microorganisms and, optionally, enzymes is applied to a stream of thin stillage and/or stream of whole stillage or a container of said stillage at desirable operating conditions suitable for propagation or action of the microorganism and enzyme chosen so as to facilitate the metabolizing of the stillage. More specifically, the bacteria may operate on the gums and/or waxes which bind the oil in the stillage, by for example, feeding upon said compounds as carbohydrate material. The result of the metabolizing process liberates oil bound in the gums and/or waxes. The microorganism and enzyme present in the stillage or added thereto may act upon the thin or whole stillage to metabolize the stillage and more specifically lipids and waxes, or gums, in the stillage. That is, the enzyme and bacteria may work in combination to break down the organic material. This process may also act upon and release at least a portion of the bound oil in distillers grains by microbial hydrolysis of proteins and polysaccharides in the germ. As a result of the foregoing, oil is released as free oil that otherwise cannot be separated by centrifugation. Upon the action of the microorganism and, optionally, enzyme, an emulsion is formed including free oils and the stillage liquid. The free oil in the emulsion may include oil already present in the stillage, as well as oil that has become un-bound or released or otherwise free due to the metabolism of the microbes and action of enzymes.

Figure 2:
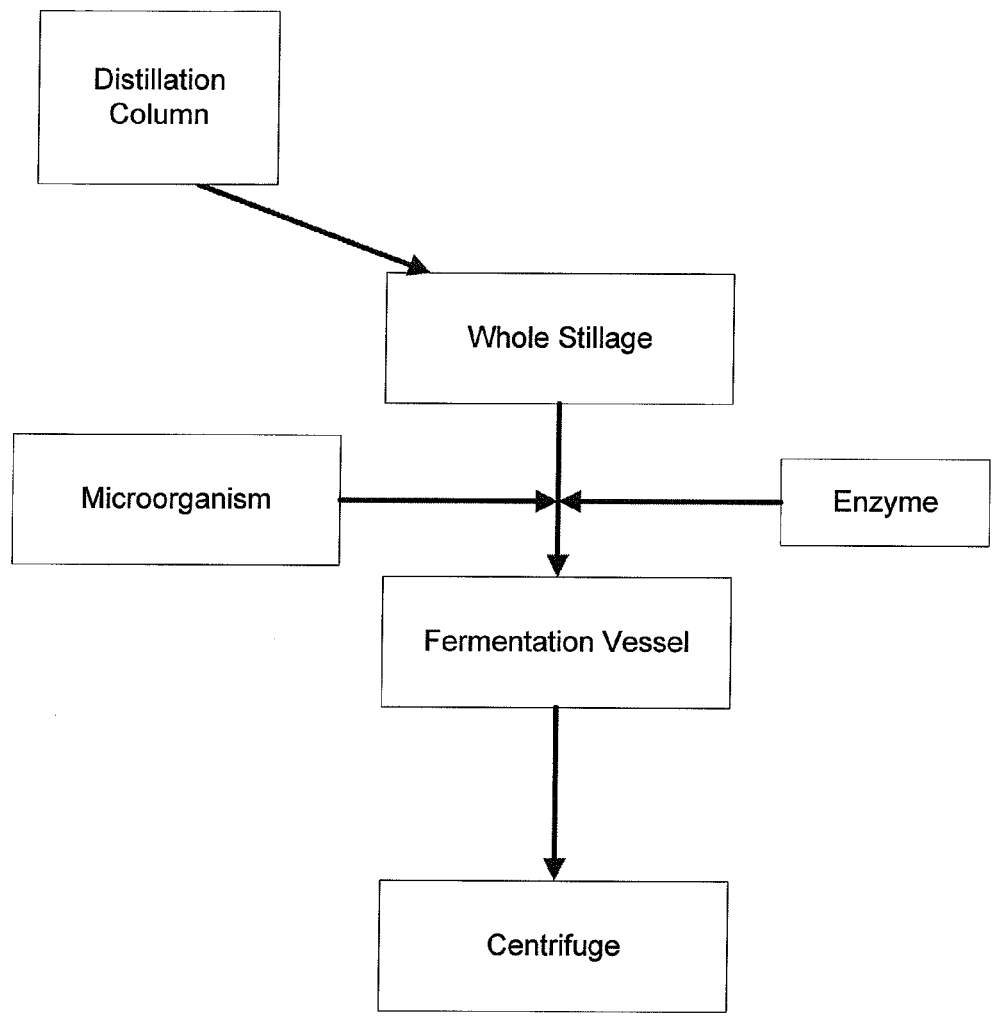
FIG. 2 shows a flow chart of one or more examples of a process flow of thin stillage or whole stillage processing in the method of liberating bound oil.

One or more microorganisms are preferably added to whole stillage leaving the distillation column (see FIG. 2). The microorganisms may be propagated in the stillage. One or more enzymes may also be optionally added and act in conjunction with the microorganism to metabolize or break down organic material in the stillage. Enzymes may also be present or existing in the stillage. Alternately, the microorganisms and/or enzymes can be added to thin stillage after separating the grains. Further, as discussed herein, the enzyme may be added by the action, that is, as a secretion or byproduct, of a particular microorganism or microorganism's action, or may be added as a separate component of the mixture. Fermentation vessels may be preferably used for the fermentation of stillage including said microorganisms and/or enzymes. Preferably, the stillage will be fermented by batch culture, but continuous flow or continuous batch are also possible.

In a preferred embodiment of the method, the microorganisms (and/or enzymes where applicable) can be added directly to the stillage or propagated in seed cultures prior to inoculation of the stillage. The inoculation rate is preferably between $1 \times 10^3$-$1 \times 10^{15}$ colony forming units (cfu) per ton of stillage and more preferably between $1 \times 10^6$-$1 \times 10^{12}$ colony forming units per ton of stillage. A seed culture may be comprised wholly of stillage or any percentage of stillage. As indicated, the fermentation of stillage can occur by batch type, continuous flow, fed batch or any type of fermentation process. pH may be maintained in a range suitable for viability of the particular microorganism chosen. Culture temperature may be adjusted to meet the optimum temperature or temperature range for any given microorganism. Culture temperature is preferably between 20-60° C. and more preferably between 25-45° C. Culture time can vary and is optimum at such point when the gums have been sufficiently metabolized by the microorganism(s) to allow for efficient removal of the crude oil from the gum. Culture time is preferably between 12-120 hours and more preferably between 24 and 48 hours.

The inoculum may also optionally be added in hydrated form. The inoculum is preferably hydrated by adding dried microbes to water and either adding directly to the main culture or propagating the microbes first in a seed culture or series of seed cultures. Seed culture propagation can substantially reduce main culture fermentation time by effectively increasing the inoculation rate. Seed cultures, as described above, may be comprised of whole or thin stillage obtained from the production process. Micronutrients such as magnesium, manganese, zinc, selenium and vitamins can also be optionally added to seed cultures and the main culture.

Figure 3:
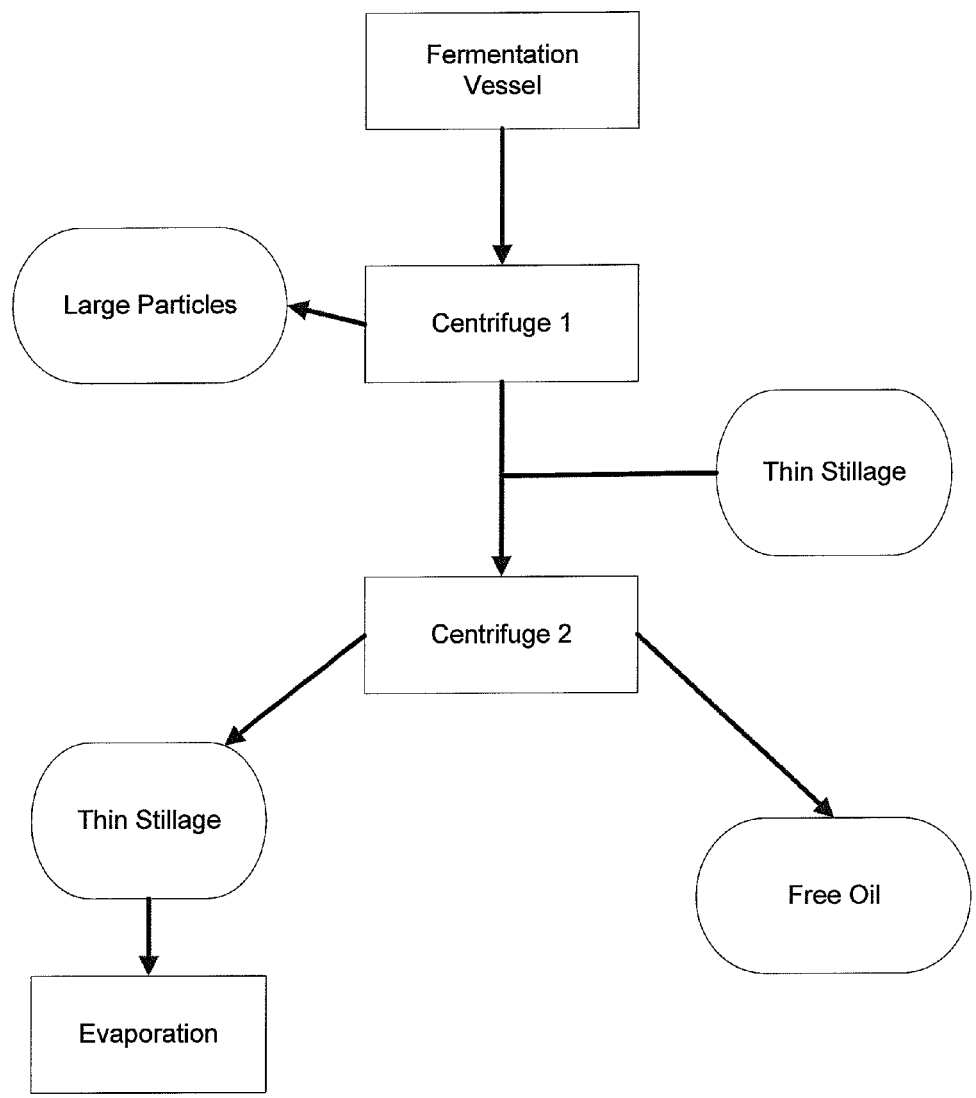
FIG. 3 shows a flow chart of one or more examples of a process flow of thin stillage or whole stillage processing in the method of liberating bound oil.

The free or un-bound oil in the stillage, both present in the stillage and separated, removed, or otherwise un-bound by the action of the microorganism and/or enzyme, can be separated by centrifugation, and preferably centrifugation at lower speeds than traditionally required. In a preferred embodiment, the force used to separate the free "crude" oil via centrifugation can range from 500-10,000×g. More preferably, the force used may be between 1,000-5,000×g. In one further example, as shown in FIG. 3, at the completion of fermentation of stillage with the microorganism and, optionally, enzyme, the stillage may be sent to or through a series of centrifuges for separation of oil from the media. In this example, when whole stillage is used as the media, a first centrifuge separates the large particles, such as but not limited to grains. Separately, a second higher speed centrifuge may be used to separate the free oil from the stillage, or stillage with large particles removed, for recovery. Following centrifugation, the separated oil may be removed or recovered by known means. The remaining thin stillage, after oil removal, may be sent, for example, to a steam evaporator to condense it to a syrup which can be sold, as is, or may be added to the grains to produce distillers grains plus solubles. The grains from the process can be sold and used wet or dry and with or without the solubles added.

The thin stillage may be sent to a steam evaporator to remove water and condense it to the byproduct condensed distillers solubles. Condensed distillers solubles can be sold, as is, or added back to the distillers grains and sold as distillers grains with solubles, either wet or dried. The coarse solids separated from the thin stillage by centrifuge may be processed or sold as wet distillers grains. The coarse solids may be dried using, for example, a rotary dryer (see FIG. 1), to form dried distillers grains.

Microorganisms suitable for use with the method of liberating bound oil include microbes or microorganisms which may propagate in stillage and utilize gums as at least one source of metabolizable carbohydrate. The microorganisms also may produce enzymes such as, but not limited to, proteases, cellulases and hemicellulases that act extracellularly to hydrolyze proteins and polysaccharides in stillage (which may bind oil as well, thus releasing more oil into the free oil form). The microorganisms may be aerobic, anaerobic or facultative or one or more combinations thereof. The microorganisms may, more preferably be bacterial. To this end, bacteria capable of propagating in stillage may be acceptable for the purposes provided. More preferably, the bacteria may be from the Class: Bacilli. Even more preferably, the bacteria may be from the Order: Lactobacillales, and even more preferably, the bacteria may be from the Genus: *Pediococcus, Lactobacillus, Enterococcus* or *Bacillus*. The bacteria may be further from the Genus: *Lactobacillus*; and Species: *Plantarum, Casei,* or *Acidophilus*. Such bacterial cultures are well known in the art, and are readily obtainable from conventional sources. Suitable microorganisms can be obtained or sourced from current commercial sources, such as Medipharm USA (Des Moines, Iowa), or may be obtained from a recognized depository such as the American Type Culture Collection (ATCC—Rockville, Md.) and various other sources known in the art. The foregoing organisms may be used alone or in any combination, and may further be used with one or several other microbes and/or enzymes, such as but not limited to alternative enzymes or microorganisms having different properties or purposes. While specific microorganisms are described, one of skill in the art would understand that alternative microorganisms or their equivalents suitable for accomplishing the purposes provided may be acceptable for use in the method described herein.

Enzymes suitable for use in one or more examples of embodiments may include, but are not limited to, beta-gulcanase, cellulases, hemicellulases, amylases, proteases, lipases or maltases, or combinations thereof. Suitable enzymes can be obtained or sourced from current commercial sources, such as AB Technologies (Springfield, Oreg.). The enzyme used may be purified or contained within a crude media, such as, but not limited to, the media in which a microbe that produced the enzyme was propagated in, or may alternatively be a separate component added to the mixture or to the stillage. For example, the bacteria may produce a cellulase enzyme. As indicated, an enzyme can be used alone or in combination with other enzymes, including those enzymes listed herein or enzymes suitable for different purposes.

As described, the action of the microbes and, optionally, enzymes upon the stillage results in an amount of free oil as well as the reduction of or substantial elimination of gums, facilitating the yield and economical recovery of oil from stillage.

EXAMPLES

The following Examples are an illustration of one or more examples of embodiments of carrying out the invention and are not intended as to limit the scope of the invention.

Example 1

A sample of condensed corn distillers solubles was obtained from a commercial ethanol production plant. The sample was diluted with water to return it to 'thin stillage' containing approximately 15% total solids. The thin stillage was centrifuged (3,200×g) to remove insolubles. The supernatant, including all the oils and gums, was decanted for use as a fermentation media. The media pH was adjusted to 7.6 with potassium hydroxide. An inoculant consisting of lactobacillus planlarum, obtained from Medipharm USA (Des Moines, Iowa), was made by re-hydrating 10 g of dried microbial culture containing $1\times10^8$ cfu per gram in 100 ml warm water. Duplicate samples of media (100 g) were inoculated with 5 ml of the re-hydrated culture and incubated anaerobically for 0, 12, 24, 36, or 48 hours. At the end of each fermentation period, the gums and oils were separated from the total media by using a separatory funnel. The gums and oils were centrifuged (Drucker 614B) at 1,200×g to separate the crude oil from any remaining gums. The oil was decanted and weighed. The gums were filtered (Whatman 54, 20-25 microns) with filter paper, rinsed, dried and weighed. The results are shown in Table 1 (FIG. 4). Before incubation (0 hours), no oil was able to be separated using the available centrifuge at 1,200×g. The hydrophobic plug on top of the centrifuged samples was a mixture of gums and oils. After any available or free oil was decanted, the remaining hydrophobic material was weighed and recorded as gums. The amount of free oil increased while the amount of gums decreased drastically over time, up to 36 hours of incubation. The results as indicated in Table 1 (FIG. 4) indicate that the microbial culture metabolized the gums in the stillage sample and allowed the oil to become free and easily separated using a relatively low input of energy (1,200×g). It is believed the bacteria used may produce one or more enzymes, or said enzymes may have been present in the stillage, which may have further acted upon the proteins and polysaccharides present in the supernatant.

Example 2

A sample of thin stillage was obtained from a commercial ethanol production plant. The sample was pH adjusted to 7.0 and used as a fermentation media without further processing. An inoculant comprising a mixture of *Lactobacillus plantarum, L. casei* and *L. acidophilus*, obtained from Medipharm USA (Des Moines, Iowa), was made by rehydrating 3 g of each dried microbial culture containing $1\times10^8$ cfu per gram in 100 ml of warm water. Triplicate sample of thin stillage media (100 g) were inoculated with 5 ml of the rehydrated culture and incubated anaerobically at ambient temperature (20° C.) for 0, 12, 24, 36 or 48 hours. At the end of each fermentation period, the gums and oils were separated from the total media by using a separatory funnel. The gums and oils were centrifuged (Drucker 614B) at 1,200×g to separate the crude oil from any remaining gums. The oil was decanted and weighed. The gums were filtered (Whatman 54, 20-25 microns) with filter paper, rinsed, dried and weighed. Table 2 (FIG. 4) shows that crude oil recovery was increased from no separation possible before inoculation and incubation (time 0) to 0.62 g of oil per 100 g of stillage. The hydrophobic gums were also reduced by 36% after 48 hours of incubation with the microbes. The pH decreased from 7.0 to 5.8, indicating the microbial culture was propagating well and producing acids. It is believed the bacteria used may produce one or more enzymes, or said enzymes may have been present in the stillage, which may have further acted upon the proteins and polysaccharides present in the supernatant.

Example 3

A sample of thin stillage was obtained from a commercial ethanol plant. The stillage was further centrifuged to remove small insoluble materials and the supernatant along with all the gums and oils was collected and used as a fermentation media. The media was pH adjusted to 7.5 using KOH and divided into triplicate Erlenmeyer flasks (1000 g media). An inoculant consisting of lactobacillus plantarum, obtained from Medipharm USA (Des Moines, Iowa), was made by rehydrating 10 g of dried microbial culture containing $1\times10^8$ cfu per gram in 100 ml warm water. Ten milliliters of inoculum was transferred into each flask before sealing them tightly and placing into an incubator-shaker set at 60° C. for 48 hours. At the end of each fermentation period, the gums and oils were separated from the total media by using a separatory funnel. The gums and oils were centrifuged at 3,000×g to separate the crude oil from any remaining gums. The oil was decanted and weighed. A sample of stillage before inoculation was also centrifuge in the same manner to collect and weigh oil. The control stillage, before inoculation, yielded 9.6 grams of oil or 0.96 wt % of the original stillage. The same stillage after inoculation and incubation for 48 hours yielded 18.5 grams of oil or about 1.85 wt % of the original stillage using the separation methods described here. It is believed the bacteria used may produce one or more enzymes, or said enzymes may have been present in the stillage, which may have further acted upon the proteins and polysaccharides present in the supernatant.

A method of reducing the amount of bound oil while increasing the amount of free oil in whole stillage or thin stillage is provided herein. This method facilitates the recovery of crude oil from said stillage and more efficiently reduces or extracts the oil content of distillers grains byproduct, as well as crude oil from distillers whole stillage or thin stillage, in a dry mill ethanol plant as compared to current systems. The increase in efficiency and yield results in increased overall profitability of ethanol production plants, by reducing energy consumption and improving the value of byproducts. In the method described and illustrated herein, the action of the microbes and/or enzymes upon the stillage results in an amount of free oil as well as the reduction of or substantial elimination of gums, facilitating the yield and economical recovery of oil from stillage. The microorganisms advantageously utilize gums as at least one source of metabolizable carbohydrate, thereby reducing the level of gums in stillage while freeing oil, increasing cell biomass and producing potentially valuable organic acids such as, but not limited to, lactic, acetic, propionic, butyric, succinic, citric, and other acids or their equivalents, as metabolic byproducts, in stillage. The method described provides further advantages, by removing the oil from the byproduct distillers grains, such as increasing the level of effective inclusion in livestock diets which permits the byproduct to be incorporated into livestock rations at higher levels, as well as allowing the oil to be directed toward higher value industrial processes or feed markets. Further, and contrary to currently existing systems, the method described herein may increase oil recovery from thin stillage to percentages above that of currently existing systems, and may in some embodiment reach nearly 100% oil recovery from thin stillage, while using low speed centrifugation.

While specific embodiments and examples are set forth herein, these embodiments are presented as exemplary embodiments of the invention, and variations thereon or variations on individual components or steps would not depart from the overall scope of the invention. For example, in an alternative embodiment, the method may use condensed distillers solubles, which is condensed thin stillage, as the media for the addition of microorganisms (and/or enzymes where applicable). In this alternative embodiment, it may be necessary to dilute the stillage media with water to lower its viscosity. Alternatively, wet distillers grains with solubles or without solubles could be re-hydrated and used as media for the microorganisms. It is also contemplated that this or other alternative embodiments may be arranged so that fermentation occurs somewhere other than the ethanol plant and is then transported to a target destination for use.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to preferred embodiments, persons skilled in the art will recognize that changes may be made in form and detail without departing from the spirit and scope of the invention.

REFERENCES

Erickson, G. E., T. J. Klopfenstein, D. C. Adams, R. J. Rasby. 2005. General overview of feeding corn milling co-products to beef cattle. In: Corn Processing co-Products Manual. University of Nebraska. Lincoln, Nebr. USA.

What is claimed is:

1. A method of processing stillage in an ethanol production process, the method comprising fermentation of a stillage stream with microorganisms of the class Bacilli which produce organic acids, wherein said microorganisms are added directly to said stillage stream.

2. The method of claim 1, wherein the ethanol production process is a dry-milling ethanol production process.

3. The method of claim 1, wherein the stillage is whole stillage resulting from the production of ethanol from grains in dry milling ethanol.

4. The method of claim 1, wherein the microorganism is of the order Lactobacillales.

5. The method of claim 4, wherein the bacteria is selected from the group consisting of the genus *Pediococcus, Lactobacillus, Enterococcus* and *Bacillus*.

6. The method of claim 4, wherein the bacteria is selected from the group consisting of the species *Plantarum, Casei*, and *Acidilactici*.

7. The method of claim 1, wherein the organic acid is lactic acid.

8. The method of claim 1, wherein the stillage is thin stillage resulting from the production of ethanol from grains in dry milling ethanol.

9. The method of claim 1, wherein the microorganism is applied and propagated by fermentation after distillation of ethanol.

10. A method of treating stillage comprising fermentation of a whole stillage stream with a microorganism of the class Bacilli which produces organic acids.

11. The method of claim 10, wherein the whole stillage is processed to form thin stillage prior to the step of fermenting with a microorganism.

12. The method of claim 10, wherein the microorganism is applied and propagated by fermentation after distillation of ethanol.

13. The method of claim 10, wherein the microorganism is of the order Lactobacillales.

14. The method of claim 13, wherein the bacteria is selected from the group consisting of the genus *Pediococcus, Lactobacillus, Enterococcus* and *Bacillus*.

15. The method of claim 13, wherein the bacteria is selected from the group consisting of the species *Plantarum, Casei*, and *Acidilactici*.

16. A method of processing stillage comprising propagating a microorganism of the class Bacilli in stillage, wherein the microorganism produces organic acids, wherein the microorganism is applied and propagated by fermentation after distillation of ethanol and applied directly the stillage stream.

17. The method of claim 16, wherein the microorganism is a bacterial microorganism of the order Lactobacillales.

* * * * *

UNITED STATES PATENT AND TRADEMARK OFFICE
CERTIFICATE OF CORRECTION

PATENT NO. : 8,603,801 B1
APPLICATION NO. : 13/463581
DATED : December 10, 2013
INVENTOR(S) : Dale It is certified that error appears in the above-identified patent and that said Letters Patent is hereby corrected as shown below:

In the Specification

In Column 7, Line 35, delete "planlarum," and insert -- plantarum, --, therefor.

In the Claims

In Column 10, Line 57, in Claim 16, delete "directly the" and insert -- directly to the --, therefor.

Signed and Sealed this
Second Day of September, 2014

Michelle K. Lee
*Deputy Director of the United States Patent and Trademark Office*